United States Patent

[11] 3,586,122

| [72] | Inventor | Stanley E. Jacke<br>Ridgefield, Conn. |
|---|---|---|
| [21] | Appl. No. | 31,966 |
| [22] | Filed | Apr. 27, 1970 |
| [45] | Patented | June 22, 1971 |
| [73] | Assignee | Branson Instruments Incorporated<br>Stamford, Conn. |

[54] SONIC APPARATUS WITH SONIC ENERGY BARRIER MEANS
8 Claims, 4 Drawing Figs.

[52] U.S. Cl. .................................................. 181/33,
181/36, 156/73, 228/1
[51] Int. Cl. ...................................... B29c 27/08,
B23k 1/06, G10k 11/00
[50] Field of Search ........................................... 228/1;
156/73; 181/33, 36, 35, 33.4

[56] References Cited
UNITED STATES PATENTS

| 2,122,517 | 7/1938 | Curtis | 181/33 (.4) |
| 3,062,695 | 11/1962 | Hull | 156/73 |
| 3,244,574 | 4/1966 | Decker et al. | 156/73 X |
| 3,483,066 | 12/1969 | Harris et al. | 228/1 X |
| 3,499,809 | 3/1970 | Wysong | 156/73 |

*Primary Examiner*—Robert S. Ward, Jr.
*Attorney*—Ervin B. Steinberg

ABSTRACT: A sonic apparatus includes a sound-absorbing enclosure which is coupled to motive means for enclosing during the sonic energy transfer cycle a substantial part of the tool and workpiece in order to shield the ambient from undesirable radiated noise.

STANLEY E. JACKE
INVENTOR.

STANLEY E. JACKE
INVENTOR.

BY:
Erwin B. Stanley

SONIC APPARATUS WITH SONIC ENERGY BARRIER MEANS

This invention refers to a sonic energy apparatus which is provided with means for preventing or reducing radiation of sonic energy to ambient. More specifically, this invention concerns a sonic processing apparatus, such as a sonic or ultrasonic welding apparatus, provided with means for reducing, or substantially eliminating, the radiation of audible noise to the surrounding space.

As used hereafter "sonic" shall be construed as including energy both in the sonic and in the ultrasonic frequency range.

During recent years sonic and ultrasonic apparatus have become increasingly important for processing liquid materials, assembling thermoplastic parts, deforming metal and the like, see for instance "Ultrasonics In Industry" by E. B. Steinberg, Proceedings of the IEEE Vol. 53, No. 10, Oct. 1965, pages 1,292 to 1,304.

In order to reduce the noise hazard to which operating personnel is exposed, most apparatus are designed for operation in the ultrasonic frequency range. Typical apparatus of this type are ultrasonic welding apparatus for thermoplastic materials, such as is shown in U.S. Pat. No. 3,244,916 issued to R. S. Soloff et al. on Dec. 21, 1965 entitled "Sonic Method of Welding Thermoplastic Parts" and an apparatus for inserting a metal element into a thermoplastic part as shown in U.S. Pat. No. 3,184,353 issued to L. Balamuth et al. dated May 18, 1965 entitled "Fastening Together of Members by High Frequency Vibrations."

While these apparatus operate in the ultrasonic frequency range and operation thereof should, for all practical purposes, be inaudible to operators, it still occurs that noise, or unwanted sound, at times emanates from processes using the ultrasonic apparatus. Such sound of lower frequency is caused by a workpiece which is set into resonance at a lower (audible) frequency and then acts as a source of audible sound. This type of noisiness is particularly noticeable when processing large, flat workpieces and specifically when such workpieces are fabricated from brittle material, for example styrene thermoplastics. A monitor for monitoring the existence of radiated noise above a predetermined level is shown, for instance, in U.S. Pat. No. 3,489,241 issued to E. B. Steinberg on Jan. 13, 1970 entitled "Control Means For Sonic Power System."

The present invention concerns a means for reducing the radiation of unwanted sound into ambient space by providing an enclosure which is associated with the source of sonic energy. More specifically, the present invention discloses an apparatus having a sonically energized tool which is adapted to be brought into contact with a workpiece for transferring sonic energy thereto. The tool is alternately brought into contact with the workpiece and then removed therefrom in order to enable the processed workpiece to be removed and another workpiece to be placed in position for engagement with the tool. An enclosure made of noise absorbing material is associated with the tool and is adapted to enclose at least a portion of the workpiece and tool during the transfer of sonic energy, thus providing a barrier to sonic energy radiating from the work station.

One of the principal objects of this invention is, therefore, the provision of a sonic apparatus provided with noise abatement means.

Another important object of this invention is the provision of a sonic apparatus having a tool adapted to provide sonic energy to a workpiece and including means for enclosing a substantial portion of the tool and workpiece in order to interpose a sound barrier between the work station and ambient.

Another important object of this invention is the provision of an apparatus operating in the ultrasonic frequency range and including an enclosure made of sound-absorbing material, the enclosure being movable and coordinated in its motion with the tool toward and away from a workpiece.

Further and still other objects of this invention will be more clearly apparent by reference to the following description when taken in conjunction with the accompanying drawings, in which.

Figure 1:
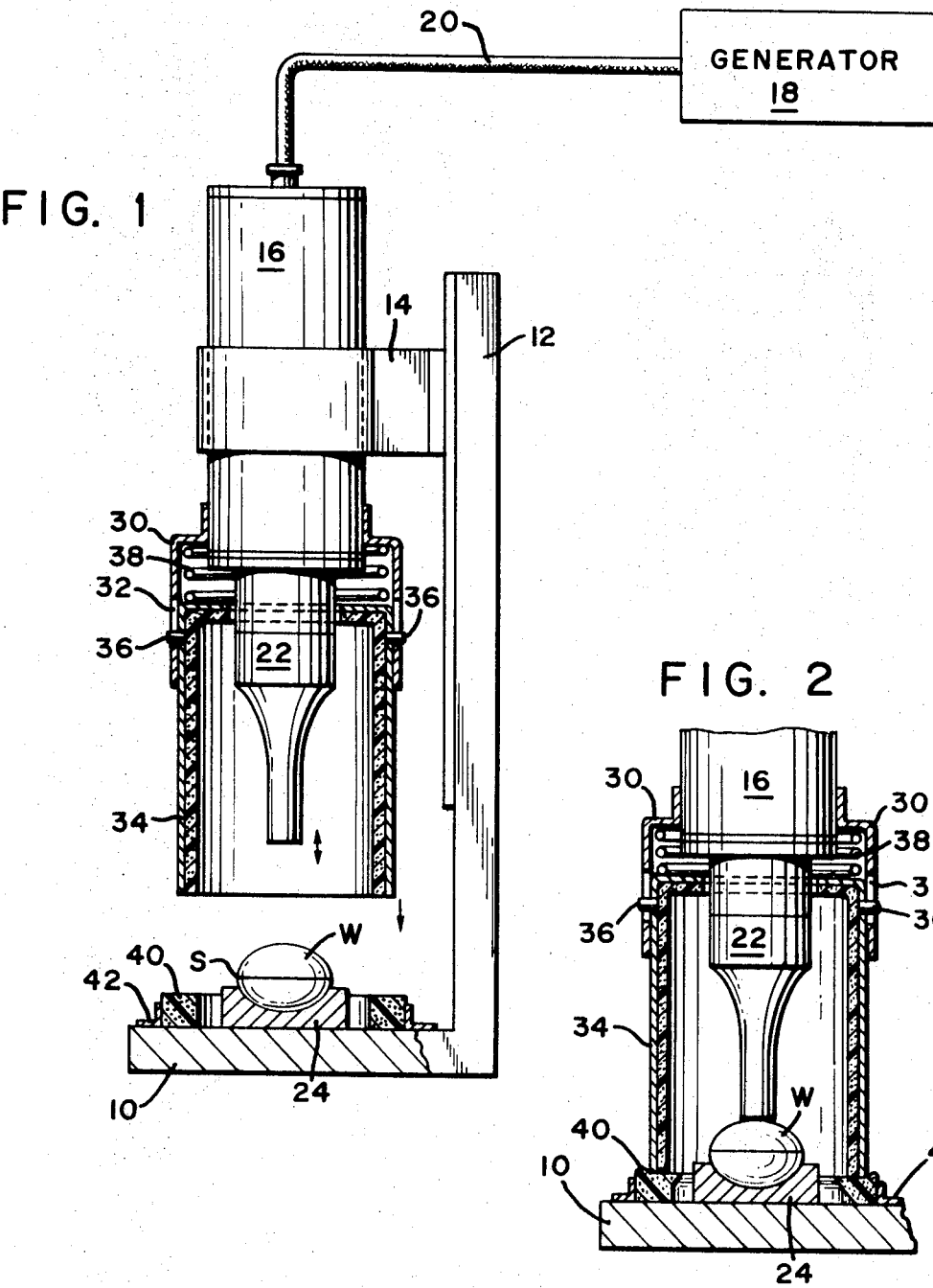
FIG. 1 is an elevational view, partly in schematic form, of a sonic or ultrasonic apparatus.

Referring now to the figures and FIG. 1 in particular, there is shown a stand supporting a sonic tool. The stand comprises a platform 10, a vertical post 12, and means 14 for supporting and moving a sonic tool relative to the platform 10. The stand, shown in a somewhat schematic form, is a commercially available item, such as the Model 227 Ultrasonic Assembly Stand available from the Branson Sonic Power Company, a division of Branson Instruments, Inc., Danbury, Conn. The construction of a similar stand is disclosed in U.S. Pat. No. 3,308,003 issued to H. Deans dated Mar. 7, 1967 entitled "Ultrasonic Sealing Apparatus," or U.S. Pat. No. 3,493,457 issued to John Jugler dated Feb. 3, 1970 entitled "Control Circuit for Tool DRiven by Sonic Energy." entitled "Control Circuit for Tool Driven by Sonic Energy." A sonic converter unit 16 is supported by the mounting means 14. A generator 18 is adapted to provide electrical high frequency energy via a cable 20 to the converter unit 16 which is fitted at its output end with a horn 22, also known as mechanical amplitude transformer, resonator, etc., see "Ultrasonic Engineering" (book) by Julian R. Frederick, John Wiley & Sons, New York, N.Y. (1965), pp. 87 to 102.

The converter unit 16 includes piezoelectric or magnetostrictive transducing means for converting the applied electrical high frequency energy to sonic energy which manifests itself as vibration. The horn or resonator 22 is used generally to increase the amplitude of vibration and serves as the coupler between the converter unit and the workpiece. A typical converter unit suitable for this purpose is disclosed in U.S. Pat. No. 3,328,610 issued to S. E. Jacke et al. on June 27, 1967, entitled "Sonic Wave Generator."

The platform 10 supports an anvil 24 which, in turn, supports a workpiece W comprising two halves which are juxtaposed along a parting surface S. If the workpiece W is fabricated from rigid or semirigid thermoplastic material and sonic energy is applied to the workpiece, the resulting dissipation of energy causes the workpiece halves to be welded together along the interface surface S as has been disclosed in the patent to R. S. Soloff et al. supra.

The converter unit 16 is fitted, moreover, with a bracket 30 having a set of slots 32. An enclosure 34 made of sound absorbing material surrounds all or a substantial portion of the horn 22. The enclosure is supported by the bracket 30 by means of pins 36 fitted within the slots 32. A helical coil spring 38, disposed between the bracket 30 and the enclosure 34, causes the enclosure 34 to be urged in a direction toward the platform 10.

The anvil 24 is surrounded by an annular gasket 40 made of noise absorbing material and the gasket is retained by a flange 42.

Upon initiating the weld cycle, the mounting means 14 with converter unit 16 moves toward the workpiece W and the underside of the noise absorbing enclosure 34 seats on the gasket 40. As the downward motion of the converter unit 16 continues, the pins 36 ride upward in the respective slots 32, and the spring 38 becomes slightly compressed. Finally, the frontal surface of the horn 22 establishes forced contact with the workpiece W, which condition stops forward motion of the converter unit and triggers the generator 18 in order to cause the transfer of sonic energy as has been described in the patent to John Jugler supra.

Figure 2:
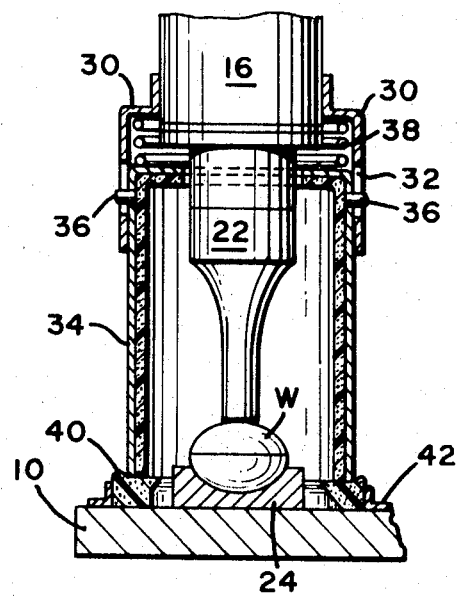
FIG. 2 is a view similar to FIG. 1 with the apparatus shown in sonic energy transferring relation with a workpiece.

It should be noted, see FIG. 2, that during the transfer of sonic energy from the tool to the workpiece W, a barrier is positioned so as to substantially reduce or eliminate the radiation of sonic energy to ambient and toward the operator. After the completion of the weld cycle, the converter unit 16 and resonator 22 are returned to their raised position, and the work station, that is the anvil 24 and platform 10, is once again completely unobstructed for permitting the removal of the welded workpiece and the placing of a new workpiece.

The enclosure 34 may be fabricated from several commercially available sound absorbing materials. For instance, the enclosure may be made of cork, or plastic sheeting which is lined with urethane foam. Alternatively, the enclosure may comprise felt impregnated metal available as "Feltmetal" from Huyck Metals Company, Milford, Conn., or "Quiet-Metal" available from the American Cyanamid Company, Wallingford, Conn. Similarly, the gasket 40 preferably is urethane foam, felt, cork, or a similar sound-absorbing material.

Figure 3:
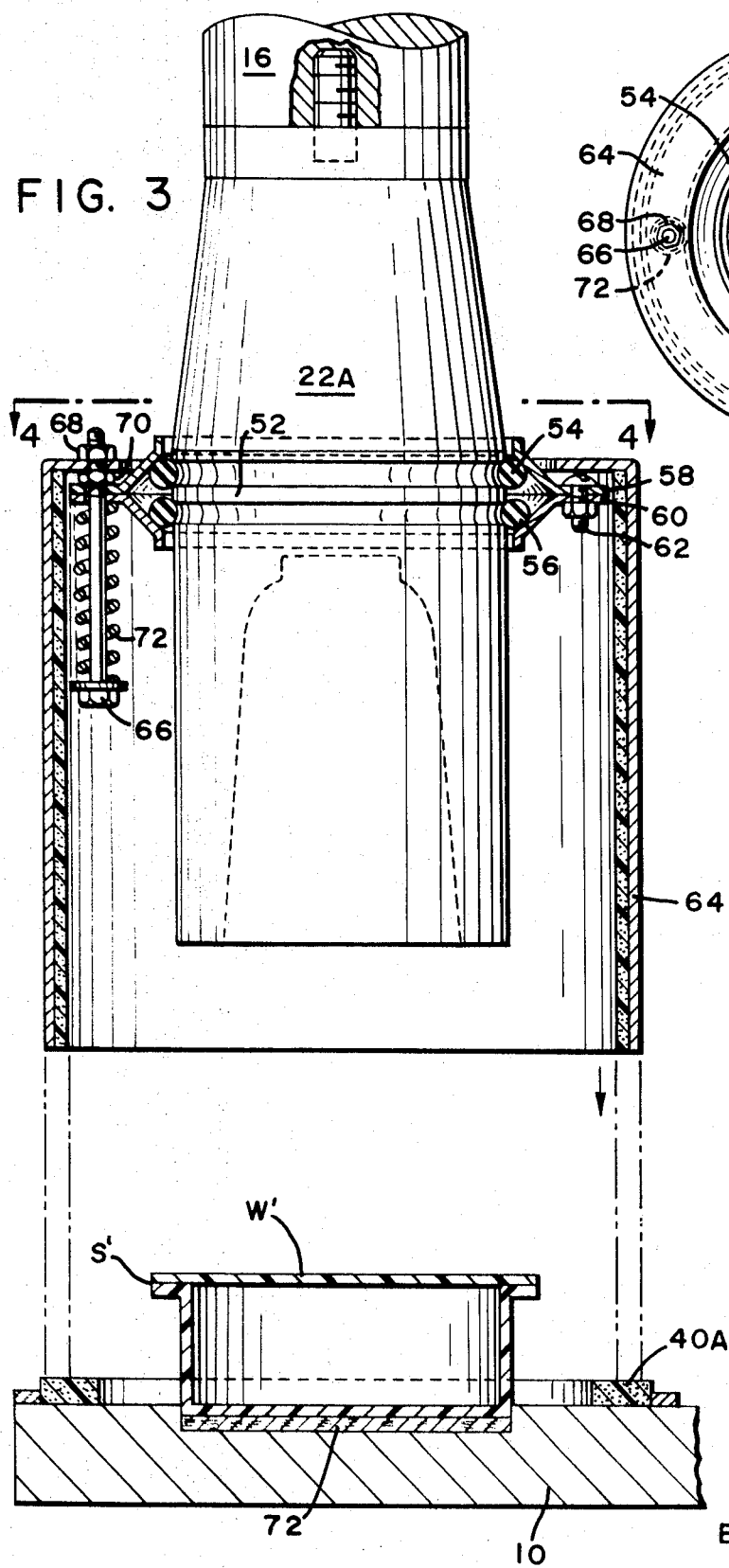
FIG. 3 is an elevational view of an alternative construction.
Figure 4:
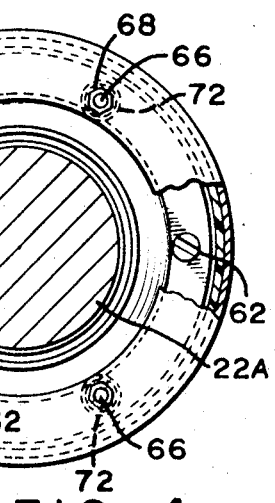
FIG. 4 is a plan view along the line 4–4 in FIG. 3.

A somewhat modified construction is shown in FIGS. 3 and 4. The enclosure, made of sound barrier material, instead of being mounted to the converter unit 16 is mounted to the horn. The platform 10 supports a workpiece W' comprising a boxlike receptacle and a cover, both are to be welded together by sonic energy along the parting line S'.

The horn 22A coupled to the converter unit 16 by a threaded bolt includes a flange 52 disposed substantially at the nodal region of longitudinal motion. A set of O-ring gaskets 54 and 56 straddle the flange 52 and a pair of flanged annular brackets 58 and 60 are seated on the respective O-ring gaskets. Screws 62 fasten the brackets 58 and 60 to each other. By virtue of the O-ring gaskets the flanged brackets 58 and 60 are acoustically isolated from the vibration of the horn 22A. A cylindrical enclosure 64 made of noise-absorbing material is supported by the flanged brackets 58 and 60, using a set of circumferentially spaced bolts 66 and nuts 68 and 70. The nuts secure the respective bolts to the flat top portion of the enclosure 64 while the shanks of the bolts 66 fit through corresponding holes in the brackets 58 and 60. The shank of each bolt 66 is surrounded by a helical compression spring 72 for causing the enclosure 64 to be biased in a direction toward the platform 10.

Upon moving the converter unit and horn 22A toward the workpiece W, the enclosure 64 seats upon the gasket 40A and remains seated as the horn continues along its downward travel for contact with the workpiece. The springs 72 become compressed and retain the enclosure firmly seated.

As described hereinbefore, sonic energy welding is accomplished during the time interval in which the horn and workpiece are surrounded by the sonic energy absorbing enclosure, and after the welding operation is completed, the horn and the enclosure are lifted in coordinated motion.

For increasing the sound absorption and to aid in the nesting of the workpiece on the anvil, a layer of cork 72, as shown in FIG. 3, may be provided underneath the workpiece.

The above-described embodiments are merely illustrative of the broad method and concept of providing a sound absorbing enclosure in connection with the operation of a sonic tool so as to minimize, if not eliminate, unwanted sound radiation to ambient. Obviously, snap-on enclosures may be used in order to provide for a ready change when it is necessary to use horns and workpieces of different configuration. However, the prime object of the present invention is to reduce the radiation to ambient of energy in the audible frequency range. As an additional safety feature, it will readily be possible to provide an interlock switch so that the enclosure must firmly be seated before the weld cycle, that is the transfer of sonic energy, is started.

While the invention has been described in connection with the welding of thermoplastic parts, it will be apparent to those skilled in the art, that this invention is not limited to this particular mode of operation, but that the insertion of metal elements into a thermoplastic block, or any other operation involving the transfer of sonic energy from a tool to a workpiece shall be comprehended by this invention.

In order to facilitate the visual observation of the sonic operation, it will be possible to fabricate a portion of the enclosure from transparent material, such as methyl methacrylate material which has been found to be suitable for this purpose. This material can be used in a window-type manner as an insert.

What I claim is:

1. A sonic apparatus comprising:
    a workpiece-supporting station;
    a tool adapted to be energized with sonic energy and adapted to contact a workpiece supported at said supporting station for imparting sonic energy to the workpiece;
    means for providing relative motion between said workpiece-supporting station and said tool for causing said tool to be alternately in a first position for enabling a workpiece to be placed upon or removed from said station, and to be in a second position contacting the workpiece;
    a sound barrier means dimensioned to enclose a portion of said tool and workpiece when said tool is in said second position, and
    means coupling said sound barrier means to said means providing relative motion for moving said barrier means in a manner to provide ready access to said station when said tool is in said first position and to enclose a portion of said tool and workpiece when said tool is in said second position, whereby to interpose a sound barrier for sonic energy radiating from the workpiece to ambient when said tool imparts sonic energy to the workpiece.

2. A sonic apparatus as set forth in claim 1, said means providing relative motion providing reciprocating motion between said tool and workpiece, and said barrier means undergoing coordinated reciprocating motion between said first and second positions.

3. A sonic apparatus comprising:
    a workpiece-supporting station;
    a tool adapted to be energized with sonic energy and adapted to be in contact with a workpiece supported at said supporting station for imparting sonic energy to the workpiece;
    motive means coupled to said tool for reciprocating said tool between a first position where said tool is lifted from said station and a workpiece supported thereupon, and a second position where said tool is in energy imparting contact with a workpiece disposed at said station;
    a sound barrier means dimensioned to enclose a substantial portion of said workpiece and a portion of said tool when said tool is in said energy imparting contact, and
    means coupling said barrier means to said motive means for moving said barrier means in coordinated motion with said tool between said two positions and to cause said barrier means to enclose said workpiece and tool when said tool is in said energy-imparting contact.

4. A sonic apparatus comprising:
    a stand having a platform and an upstanding column;
    means disposed on said platform for supporting a workpiece;
    a movable support coupled to said column and adapted to be moved selectively toward and away from said platform;
    a converter unit having a solid horn coupled thereto supported by said movable support, and said converter unit and horn providing sonic energy to a workpiece disposed on said platform means responsive to electrical excitation supplied to said converter unit and said horn being brought into contact with the workpiece, and
    an enclosure made of sound-absorbing material dimensioned and coupled for coordinated motion with said movable support for enclosing a substantial portion of the workpiece and of said horn when said horn is in contact with the workpiece,
    whereby to cause a sound barrier means to be interposed between the workpiece and horn and ambient during the time interval said horn provides sonic energy to the workpiece.

5. A sonic apparatus as set forth in claim 4 and means coupled to said enclosure for enabling said enclosure to move a limited amount relative to the motion of said horn to provide for seating of said enclosure on said platform prior to contact between said horn and workpiece.

6. A sonic apparatus as set forth in claim 5, said upstanding column being disposed in a generally vertical direction and said enclosure moving in a direction along the axis of said column.

7. A sonic apparatus as set forth in claim 4, said platform being provided with sound absorbing means, and said enclosure when enclosing a substantial portion of the workpiece and horn being seated on said sound-absorbing means.

8. A sonic apparatus as set forth in claim 4, said enclosure being mounted to said horn and including means for acoustically isolating said enclosure from said horn.